March 1, 1932.     E. HERKT     1,847,610
TWO-STROKE INTERNAL COMBUSTION ENGINE
Filed Oct. 2, 1929
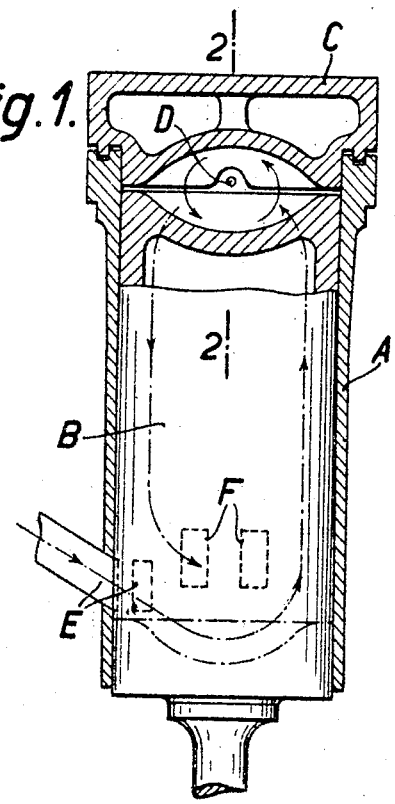
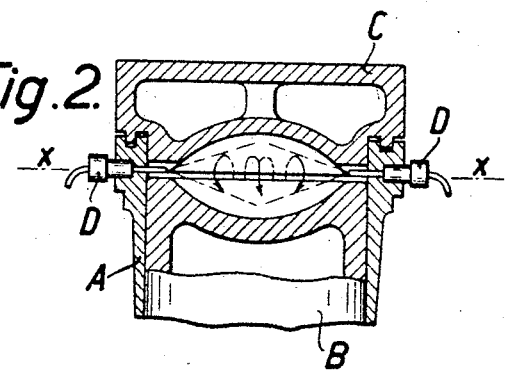
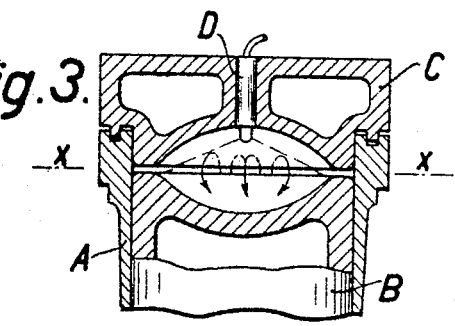
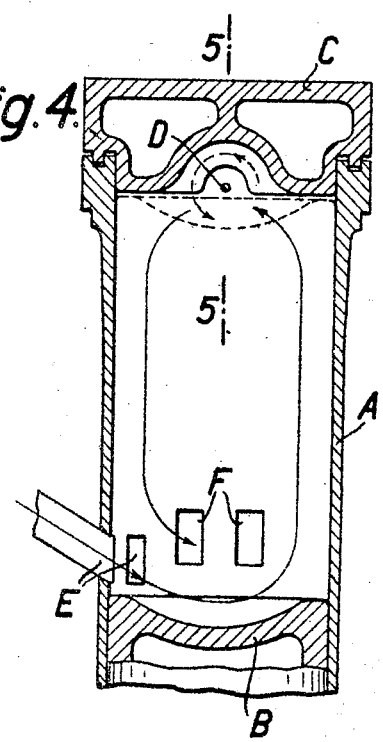
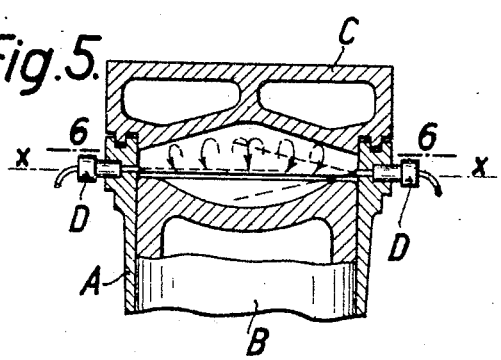
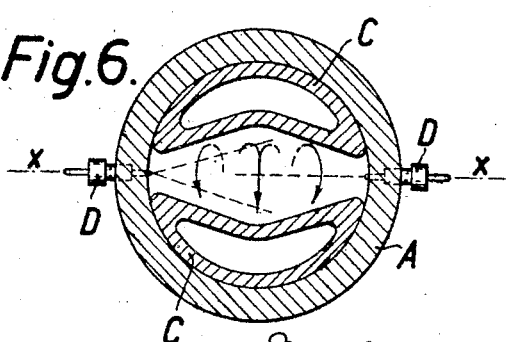
Inventor
Ernst Herkt
By Bright Bros.
Attorney Patented Mar. 1, 1932

1,847,610

UNITED STATES PATENT OFFICE

ERNST HERKT, OF KIEL, GERMANY, ASSIGNOR TO FRIED. KRUPP GERMANIAWERFT AKTIENGESELLSCHAFT, OF KIEL-GAARDEN, PRUSSIA, GERMANY

TWO-STROKE INTERNAL COMBUSTION ENGINE

Application filed October 2, 1929, Serial No. 396,797, and in Germany October 15, 1928.

The invention relates to internal combustion engines with reversing scavenging.

In engines of this kind, owing to the nature of the scavenging, a rotary movement of the scavenging air is produced around an axis perpendicular with respect to the cylinder axis.

The invention has for its object, by imparting a special shape to the combustion chamber, also to maintain this rotary movement during combustion and by suitably arranging the injection nozzles and the direction of the fuel jets, to render possible its utilization for mixing the fuel with the air of combustion.

According to the invention this object is achieved by the fact that the piston head and cylinder cover are made concave, whereby a combustion chamber is formed in which the rotary movement around an axis perpendicular with respect to the cylinder axis imparted to the air of combustion by the scavenging process is maintained during the fuel injection and that the fuel is injected in individual jets transversely to the direction of the rotary movement.

In the accompanying drawings the invention is shown by way of example in three embodiments.

Fig. 1 shows a longitudinal section through the working cylinder and piston of a two-stroke internal combustion engine with reversing slit scavenging. The piston is shown in part elevation.

Fig. 2 is a section through the combustion chamber on the line 2—2 of Fig. 1, and Fig. 3 shows, in a view corresponding to Fig. 2, the section through the combustion chamber of an engine with central fuel injection.

Fig. 4 shows in longitudinal section the cylinder of an internal combustion engine, the hollow cylinder cover of which is of different shape from that of the previous embodiments.

Fig. 5 is a longitudinal section through the combustion chamber on the line 5—5 of Fig. 4, whilst Fig. 6 is a cross section on the line 6—6 of Fig. 5.

In the drawings A corresponds to the cylinder casing, B to the working piston and C the cylinder cover. D represents the injection nozzles for the fuel, E the admission slits and F the outlet slits for the scavenging air. During the scavenging the scavenging air follows the path through the cylinder indicated by the arrow lines. It is guided through the admission slits E past the piston head and upwards along the opposite cylinder wall, reverses on the cylinder cover and flows towards the outlet slits F provided on the two sides of the cylinder with which the scavenging air does not come into contact during its passage over the piston head. Owing to the special arrangement of the slits the scavenging air, as shown in Figs. 1 and 4, executes a rotary movement in the cylinder around an axis perpendicular with respect to the cylinder axis. This rotary movement continues even after completion of the scavenging and, when the piston has reached its upper dead point (Fig. 1), owing to the concavity of cover and piston, becomes converted into a substantially circular movement around the axis $x$—$x$, as shown in the drawings by arrows.

According to the invention this rotary movement of the air of combustion is utilized for effecting a good distribution of the airless injected fuel over the entire air of combustion. For this purpose the fuel is injected in jets transversely to the movement of the air of combustion.

According to Figs. 2, 5 and 6, the injection can be effected from the side through two fuel nozzles D arranged in the axis of rotation $x$—$x$ or through a centrally arranged nozzle D (see Fig. 3). These fuel nozzles D are of the type which project a flat divergent jet of fuel. In any case the individual fuel jets are so directed that they traverse the rotating currents of the air of combustion.

In the embodiment according to Figs. 4 to 6, the cover C is made so concave that the part of the combustion chamber located inside the cover tapers down towards the fuel nozzles. In this case, as shown in Figs. 5 and 6, the fuel is injected in such a manner that two fuel jets coming from opposite directions always lie in different planes passing through the axis x—x.

In the case of mixture scavenging engines with reversing slit scavenging it was already known to make the cover and piston head concave. In this case, however, the effect proposed by the invention does not take place, as in engines of this kind scavenging is effected by the ready mixed fuel and air mixture.

What I claim and desire to secure by Letters Patent, is:—

1. A two-stroke internal combustion engine comprising a cylinder and piston, the cylinder cover and piston head each being concave, whereby a combustion chamber is formed, means for injecting scavenging air in a direction to produce a rotary movement of the air around an axis substantially perpendicular to the cylinder axis, two nozzles arranged at opposite sides of the cylinder in the axis of said rotary movement, each of said nozzles projecting a flat jet of fuel, each of said jets coming from opposite directions and lying in a different plane passing through the said axis of rotary movement.

2. A two-stroke internal combustion engine comprising a cylinder and piston, the cyinder cover and piston head each being concave, whereby a combustion chamber is formed, means for injecting scavenging air in a direction to produce a rotary movement of the air around an axis substantially perpendicular to the cylinder axis, two nozzles arranged at opposite sides of the cylinder in the axis of said rotary movement, each of said nozzles projecting a divergent jet of fuel into said combustion chamber, said cylinder cover being so concave that the part of the combustion chamber located therein tapers down from the middle point of the cylinder towards the fuel nozzles.

The foregoing specification signed at Hamburg, Germany, this 20th day of September, 1929.

ERNST HERKT.